(12) United States Patent
Sörqvist et al.

(10) Patent No.: US 6,658,107 B1
(45) Date of Patent: Dec. 2, 2003

(54) METHODS AND APPARATUS FOR PROVIDING ECHO SUPPRESSION USING FREQUENCY DOMAIN NONLINEAR PROCESSING

(75) Inventors: Patrik Sörqvist, Spånga (SE); Anders Eriksson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/177,538

(22) Filed: Oct. 23, 1998

(51) Int. Cl.⁷ .............................................. H04M 1/00
(52) U.S. Cl. .............................. 379/406.05; 379/406.04
(58) Field of Search ....................... 379/406.01, 406.02, 379/406.03, 406.04, 406.05, 406.06; 600/509; 361/92

(56) References Cited

U.S. PATENT DOCUMENTS

| | | | |
|---|---|---|---|
| 4,282,411 A | | 8/1981 | Stewart |
| 4,577,071 A | | 3/1986 | Johnston et al. |
| 4,947,857 A | * | 8/1990 | Albert et al. ............... 600/509 |
| 5,007,047 A | | 4/1991 | Sridhar et al. |
| 5,157,653 A | | 10/1992 | Genter |
| 5,247,512 A | | 9/1993 | Sugaya et al. |
| 5,274,705 A | | 12/1993 | Younce et al. |
| 5,305,307 A | | 4/1994 | Chu |
| 5,315,585 A | | 5/1994 | Iizuka et al. |
| 5,396,488 A | | 3/1995 | Lähdemäki |
| 5,475,731 A | | 12/1995 | Rasmusson |
| 5,561,668 A | * | 10/1996 | Genter .................. 379/406.07 |
| 5,563,944 A | | 10/1996 | Hasegawa |
| 5,587,998 A | | 12/1996 | Velardo, Jr. et al. |
| 5,646,991 A | | 7/1997 | Sih |
| 5,732,134 A | | 3/1998 | Sih |
| 5,734,575 A | * | 3/1998 | Snow et al. ................... 361/92 |
| 6,160,886 A | * | 12/2000 | Romesburg et al. ... 379/406.05 |
| 6,163,608 A | * | 12/2000 | Romesburg et al. ... 379/406.01 |
| 6,195,430 B1 | * | 2/2001 | Eriksson et al. ....... 379/406.05 |

FOREIGN PATENT DOCUMENTS

| | | |
|---|---|---|
| FI | 97/49196 | * 12/1997 |
| WO | WO98/33311 | 7/1998 |

OTHER PUBLICATIONS

R. Martin, S. Gustafsson, The Echo Shaping Approach to Acoustic Echo Control, Institute of Communication Systems and Data Processing, Aachen University of Technology, Aachen, Germany, Speech Communication 20 (1996), pp. 181–190.

S. Gustafsson et al.: "Combined Acoustic Echo Control and Noise Reduction for Hands–Free Telephony," Signal Processing European Journal Devoted to the Methods and Applications of Signal Processing, vol. 64, No. 1, Jan. 1, 1998, pp. 21–32 (XP004108821).

* cited by examiner

*Primary Examiner*—Forester W. Isen
*Assistant Examiner*—Jeffrey Harold

(57) ABSTRACT

Frequency domain nonlinear processing techniques are applied in the context of echo suppression. According to exemplary embodiments, the filtering characteristic of a nonlinear processor is dynamically adjusted by comparing the power spectrum of a residual echo component of a communication signal with that of the overall communication signal itself. For example, the filtering characteristic can be adjusted so that the nonlinear processor blocks only those signal frequencies in which the residual echo is, in some sense, dominant. The disclosed techniques make full duplex communication possible during the entirety of a conversation, even while residual echo is being actively suppressed.

29 Claims, 3 Drawing Sheets

METHODS AND APPARATUS FOR PROVIDING ECHO SUPPRESSION USING FREQUENCY DOMAIN NONLINEAR PROCESSING

FIELD OF THE INVENTION

The present invention relates to communications systems, and more particularly, to echo suppression in a bi-directional communications link.

BACKGROUND OF THE INVENTION

In many communications systems, for example landline and wireless telephone systems, voice signals are often transmitted between two system users via a bidirectional communications link. In such systems, speech of a near-end user is typically detected by a near-end microphone at one end of the communications link and then transmitted over the link to a far-end loudspeaker for reproduction and presentation to a far-end user. Conversely, speech of the far-end user is detected by a far-end microphone and then transmitted via the communications link to a near-end loudspeaker for reproduction and presentation to the near-end user.

At either end of the communications link, loudspeaker output detected by a proximate microphone may be inadvertently transmitted back over the communications link, resulting in what may be unacceptably disruptive feedback, or echo, from a user perspective. This problem is particularly prevalent in the context of hands-free telephony, where the user's body does not effectively isolate microphone from loudspeaker. Furthermore, impedance mismatches at hybrid junctions in a landline network can result in similarly disruptive echo.

Conventionally, echo suppression has been accomplished using echo canceling circuits which employ adaptive filters to estimate and remove the unwanted echo component of a communications signal. For example, U.S. Pat. No. 5,475,731, entitled "Echo-Canceling System and Method Using Echo Estimate to Modify Error Signal" and issued Dec. 12, 1995, describes the use of Least Mean Square (LMS) and Normalized Least Mean Square (NLMS) algorithms in updating Finite Impulse Response (FIR) adaptive filters.

Though such known echo cancellation techniques do remove some echo, audible residual echo will often remain even after cancellation. Such residual echo can, despite its relatively low level, be quite disturbing and should therefore be removed. Today, residual echo suppression is typically accomplished using some form of Non-Linear Processor (NLP) following an echo canceler. See, for example, the above cited U.S. Pat. No. 5,475,731, which describes the use of a conventional center-clipping NLP.

Most known NLPs completely remove those parts of a communications signal containing residual echo. As a result, when both a near-end and a far-end speaker are active (i.e., during double-talk), such known NLPs either pass the residual echo through or remove both the near end speech and the residual echo. Additionally, when known NLPs are used in contexts with complex background noise (e.g., when a car radio is playing while a driver is using a hands-free mobile telephone), the background sounds are also removed along with the residual echo. Though pre-computed comfort noise can be added in an attempt to fill the resulting holes, the processed signal is often choppy and bothersome from a receiving user's perspective.

Consequently, there is a need for improved methods and apparatus for removing residual echo in communications signals.

SUMMARY OF THE INVENTION

The present invention fulfills the above-described and other needs by providing improved frequency domain nonlinear processing techniques. Generally, the filtering characteristic of a nonlinear processor according to the invention is dynamically adjusted by comparing the power spectrum of a residual echo component of a communication signal with that of the overall communication signal itself. More specifically, the filtering characteristic of the nonlinear processor is adjusted so that the nonlinear processor blocks only those signal frequencies in which the residual echo is dominant. Advantageously, a nonlinear processor according to the invention makes full duplex communication possible during the entirety of a conversation, even while actively reducing residual echo.

An exemplary echo suppressor according to the invention includes a processor configured to compute a power spectrum of a communications signal and to estimate a power spectrum of a residual echo component of the communications signal. The exemplary echo suppressor also includes an adaptive filter configured to process the communications signal and to thereby suppress the residual echo component. A filtering characteristic of the adaptive filter is adjusted based on the power spectrum of the communications signal and on the estimated power spectrum of the residual echo.

An exemplary method for suppressing residual echo in a communications signal according to the invention includes the steps of computing a power spectrum of the communications signal and estimating a power spectrum of the residual echo. According to the exemplary method, a filtering characteristic is adjusted based upon the computed power spectrum of the communications signal and upon the estimated power spectrum of the residual echo, and the communications signal is filtered, using the adjusted filtering characteristic, to suppress the residual echo.

According to the embodiments, the filtering characteristic can be adjusted, for example, using spectral subtraction techniques. Alternately, individual coefficients of the filtering characteristic can be set based on direct comparisons of the power in the residual echo with the power in the overall communications signal at the frequencies corresponding to the coefficients.

For stand alone configurations (i.e., where no leading echo canceler is present), estimation of the power spectrum of the residual echo can be accomplished by estimating an attenuation factor of the echo return path and scaling power spectrum samples of the echo source signal by the estimated attenuation factor to thereby provide estimated power spectrum samples of the residual echo. When a leading adaptive echo canceler is present, estimation of the power spectrum of the residual echo can be carried out by computing a power spectrum of an echo component estimate provided by the echo canceler, and scaling the power spectrum of the echo component estimate (based on operation of the adaptive echo canceler) to thereby provide the estimate of the power spectrum of the residual echo.

Scaling of the power spectrum of the echo component estimate can include the steps of determining an echo return loss enhancement of the adaptive echo canceler, and multiplying the power spectrum of the echo component estimate by the echo return loss enhancement to provide the estimate of the power spectrum of the residual echo. Alternatively, scaling of the power spectrum of the echo component estimate can include the steps of determining the echo return loss enhancement of the adaptive echo canceler, computing an average value for the power spectrum of the echo component estimate, multiplying the average value by the echo return loss enhancement to provide a saturation value, multiplying the power spectrum of the echo component estimate by the echo return loss enhancement to provide a scaled spectrum, and clipping the scaled spectrum at the saturation value to thereby provide the estimate of the power spectrum of the residual echo.

Advantageously, the present invention also provides methods and apparatus for adding suitable comfort noise to the filtered (i.e., echo suppressed) communications signal. Generally, a power spectrum of a noise component of the communications signal is estimated, and the comfort noise is created based upon the estimated power spectrum of the noise component and on the prevailing echo-suppression filtering characteristic. According to exemplary embodiments, the comfort noise adds energy at suppressed frequencies (i.e., at frequencies where the filtering characteristic is removing energy and thereby suppressing echo) so that the total energy at those frequencies is equal that of the prevailing noise.

The above-described and other features and advantages of the invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE INVENTION

Figure 1:
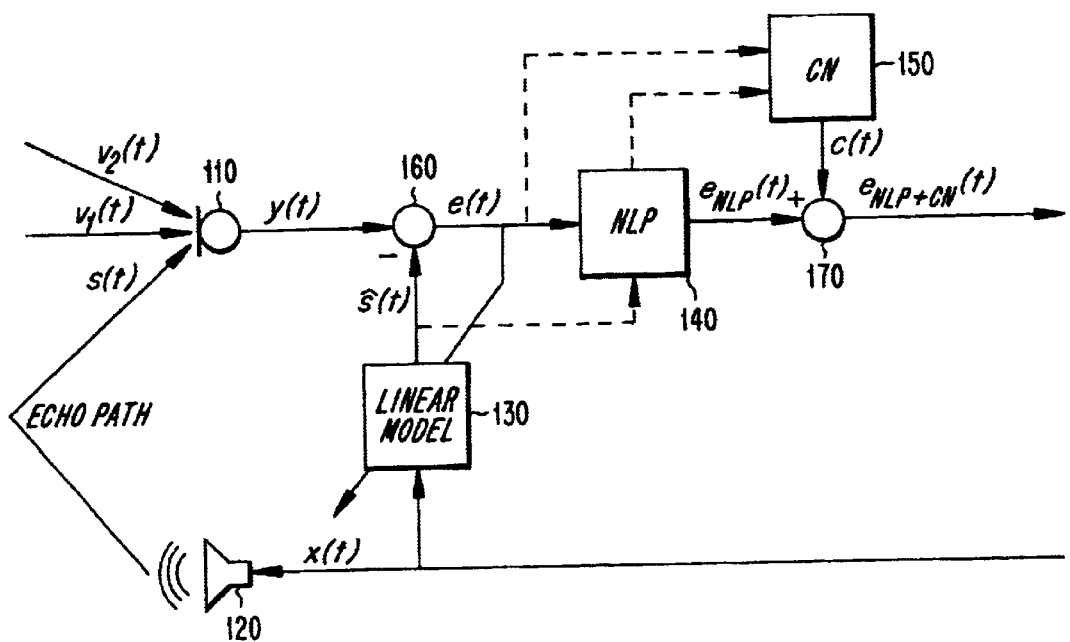
FIG. 1 is a block diagram of an exemplary acoustic echo suppression system in which the teachings of the present invention can be implemented.
Figure 2:
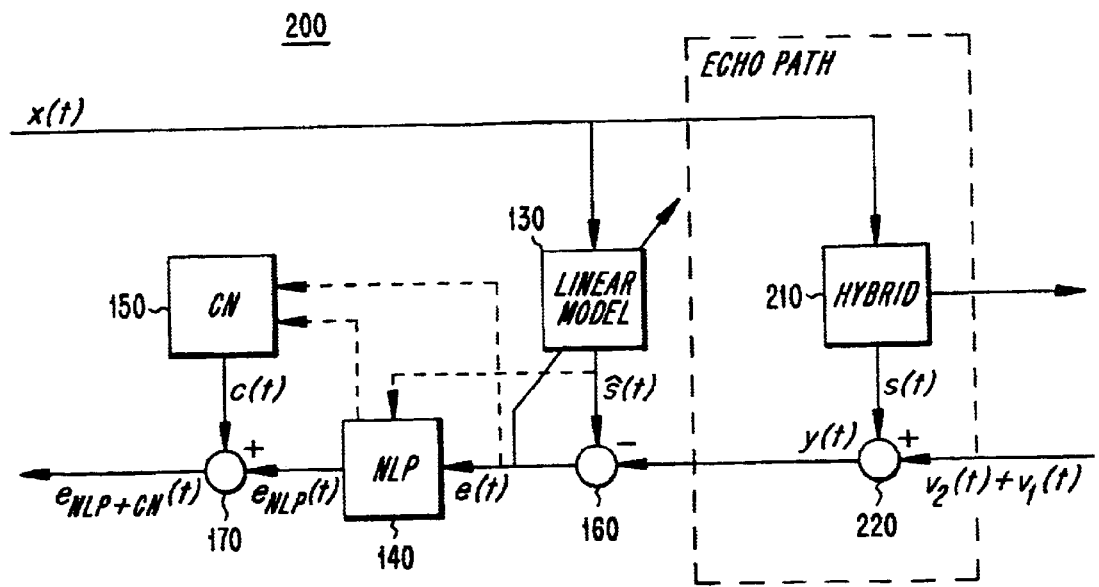
FIG. 2 is a block diagram of an exemplary network echo suppression system in which the teachings of the present invention can be implemented.

The frequency domain nonlinear processing techniques of the invention are equally applicable in the contexts of acoustic and network echo suppression. Accordingly, FIGS. 1 and 2 depict, respectively, exemplary acoustic and network echo suppression systems 100, 200 in which the teachings of the present invention can be implemented. As shown, the exemplary acoustic echo suppression system 100 includes a microphone 110, a loudspeaker 120, a linear echo canceler 130, a nonlinear processor 140, a comfort noise generator 150, and first and second summing devices 160, 170. The exemplary network echo suppression system 200 includes the echo canceler 130, the nonlinear processor 140, the comfort noise generator 150, and the summing devices 160, 170 of FIG. 1, as well as a hybrid junction 210 and a third summing device 220. Those skilled in the art will appreciate that the below described functionality of the various elements of FIGS. 1 and 2 can be implemented, for example, using known digital signal processing components, one or more application specific integrated circuits (ASICs), or a general purpose digital computer.

In operation, the loudspeaker 120 of FIG. 1 receives a far-end audio signal x(t) and outputs a corresponding acoustic signal to a near-end system user (not shown). At the same time, the microphone 110 receives an acoustic signal including a near-end speech component $v_1(t)$, a near-end noise component $v_2(t)$ and an echo component s(t) resulting from reflection of the loudspeaker output. The microphone 110 converts the received acoustic signal to a corresponding audio signal y(t) which is coupled to an additive input of the first summing device 160. Additionally, the linear echo canceler 130 processes the far-end audio signal x(t) using known adaptive filtering techniques to provide an estimate ŝ(t) of the echo component s(t) of the microphone signal y(t). The resulting echo estimate ŝ(t) is coupled to a subtractive input of the first summing device 160 and thus subtracted from the microphone signal y(t) to provide an echo-canceled, or error signal e(t).

The error signal e(t) is fed back to the linear echo canceler 130 for use in providing the echo estimate ŝ(t) and is also coupled to an input of the nonlinear processor 140. As is described in detail below, the nonlinear processor 140 filters the error signal e(t), based on the echo estimate ŝ(t), to provide an echo-suppressed output signal $e_{NLP}(t)$ which is coupled to an additive input of the second summing device 170. As is also described in detail below, the comfort noise generator 150 provides a comfort noise signal c(t) based on the error signal e(t) and on the prevailing filtering characteristic of the nonlinear processor 140. The comfort noise signal c(t) is coupled to a second additive input of the second summing device 170 and thereby added to the echo suppressed output $e_{NLP}(t)$ of the nonlinear processor 140 to provide an echo suppressed and comfort noise enhanced output signal $e_{NLP+CN}(t)$.

In the network system 200 of FIG. 2, the hybrid junction 210 receives a far-end audio signal x(t) and provides a corresponding network signal to a near-end system user (not shown). Additionally, impedance mismatches at the hybrid 210 cause an echo s(t) of the far-end signal x(t) to be additively coupled with received near-end voice and noise signals $v_1(t)$, $v_2(t)$ (shown conceptually via the third summing device 220) and passed back to the additive input of the first summing device 160. As in the system 100 of FIG. 1, the linear echo canceler 130 processes the far-end audio signal x(t) using known adaptive filtering techniques to provide an estimate ŝ(t) of the echo component s(t) of the near-end signal y(t). The resulting echo estimate ŝ(t) is coupled to the subtractive input of the first summing device 160 and thus subtracted from the near-end signal y(t) to provide the echo-canceled, or error signal e(t). The nonlinear processor 140 and the comfort noise generator 150 operate on the error signal e(t) as described with respect to FIG. 1 (and as described in detail below) to provide the echo suppressed and comfort noise enhanced output signal $e_{NLP+CN}(t)$.

In both the acoustic and network systems 100, 200, the error signal e(n) is equal to the sum of the near end speech $v_1(n)$, the background noise $v_2(n)$ and the echo s(n), less the estimated echo ŝ(n) (where the variable n is used to indicate time domain samples):

$$e(n) = v_1(n) + v_2(n) + s(n) - \hat{s}(n)$$

Additionally, the residual echo š(n) is defined as the true echo s(n) less the estimated echo ŝ(n):

$$\check{s}(n) = s(n) - \hat{s}(n)$$

According to the invention, the filtering characteristic of the nonlinear processor 140 is dynamically computed based on the error signal e(n) and the residual echo ŝ(n). Specifically, the spectral content of the error signal e(n) is compared to an estimate of the spectral content of the residual echo ŝ(n), and the filtering characteristic of the nonlinear processor 140 is adjusted to pass only those frequencies for which the residual echo ŝ(n) is, in a sense, the dominant component of the error signal e(n).

To compare the spectral content of the error signal e(n) with that of the residual echo ŝ(n), the error signal e(n) and the echo estimate ŝ(n) are first converted to the frequency domain. For example, M-point Fast Fourier Transforms (FFTs) can be used to compute the corresponding frequency domain signals E(k), (Ŝk) directly from the time domain samples (where k represents the discrete frequencies ranging from 0 to 0.5 in steps of 2/M). Alternatively, to reduce the variance in the frequency domain results, auto-regressive (AR) models of order p can first be computed for the error signal e and the echo estimate ŝ based on, for example, a set of N time domain data samples for each signal. M-point FFTs of the zero padded AR(p) sequences then provide the discrete frequency domain variables E(k) and Ŝ(k) as desired. In practice, suitable values for the variables p, N and M are 10, 160 and 256, respectively. Of course, the order p used for modeling the error signal e can be different than that used for modeling the echo estimate ŝ.

Once the frequency domain sequences E(k) and Ŝ(k) have been computed, a corresponding Power Spectral Density (PSD) can be computed for each sequence by multiplying each sequence, in a sample-wise fashion, by its complex conjugate sequence as follows:

$$\Phi_e(k) = E(k)E^*(k)$$

$$\Phi_{\hat{s}}(k) = \hat{S}(k)\hat{S}^*(k)$$

Next, the power spectral density of the residual echo, $\Phi_{\hat{s}}$, can be estimated from the power spectral density of the estimated echo, $\Phi_{\hat{s}}$. A first approximation can be obtained using the Echo Return Loss Enhancement (ERLE) provided by the echo canceler. The ERLE of an echo canceler provides an indication of the level of echo suppression achieved by the echo canceler, and methods for computing the ERLE of an echo canceler are well known. Using the assumption that the spectrum for the residual echo is similar to the spectrum for the estimated echo, then the power spectral density of the residual echo can be estimated at ERLE dB below the power spectral density of the estimated echo as follows:

$$\hat{\Phi}_{\hat{s}}(k) \approx ERLE\Phi_{\hat{s}}(k)$$

Figure 3:
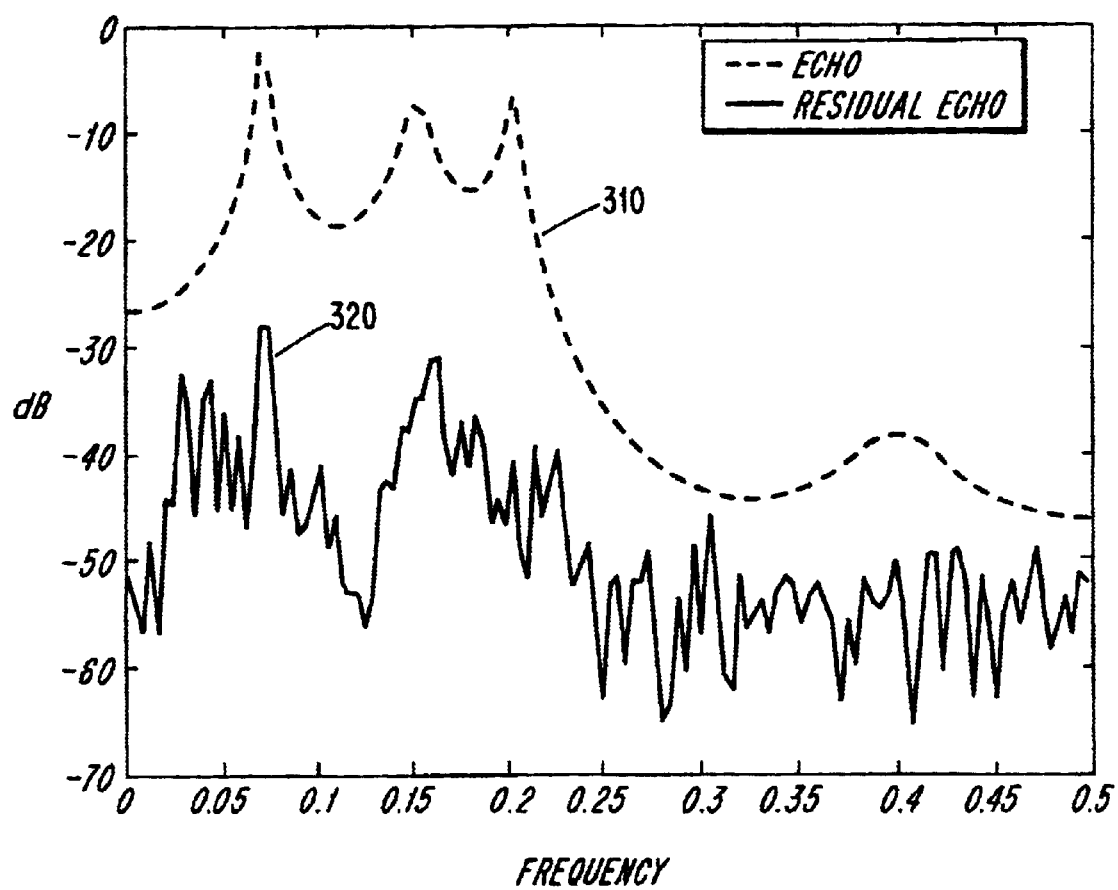
FIG. 3 provides a frequency domain comparison of a typical echo signal and a corresponding residual echo signal and thereby further provides motivation for certain aspects of the present invention.

However, examination of emperical data reveals that the residual echo is actually often much higher than ERLE dB below the echo estimate, particularly for frequencies having low energy compared to the maximum energy in the spectra (for speech, usually the higher frequencies). See, for example, FIG. 3, where an actual residual echo curve 320 is approximately ERLE dB (roughly 15 dB in the Figure) below an actual estimated echo curve 310 for a lower frequency range (0 to 0.25 in the Figure), and greater than ERLE dB below the estimated curve 310 for a higher frequency range (0.25 to 0.5 in the Figure).

To provide a better approximation, the ERLE measurement can be made frequency dependent. However, doing so requires a stationary distribution (when in fact the ERLE is often varying in time as well as frequency) and, in instances in which significant near-end energy exists in the higher frequency bands, an undesirable degree of near-end signal clipping could be introduced. A more practical solution can be achieved by saturating the estimate of the power spectral density of the residual echo at ERLE dB below the mean level of the power spectral density of the estimated echo, as follows:

$$\hat{\Phi}_{\hat{s}}(k) \approx \text{Max}(ERLE\Phi_{\hat{s}}(k), ERLE\overline{\Phi_{\hat{s}}})$$

The estimate of the power spectral density of the residual echo can then be used to derive an appropriate filtering characteristic, or transfer function H(k) for the nonlinear processor. For example, the teachings of spectral subtraction (often used in noise reduction contexts) can be applied to provide an intuitively correct echo clipping filter H(k) as follows:

$$H(k) = \sqrt{\frac{\Phi_e(k) - \delta_1 \Phi_{\hat{s}}(k)}{\Phi_e(k)}}$$

where $\delta_1$ is the subtraction factor. Emperical studies have shown that values for $\delta_1$ in the range of 1–4 are appropriate in the echo suppression context.

In practice, determining the filter H(k) directly from the above equation can be overly complex (i.e., computing a square root using standard digital signal processing components is often undesirable), and furthermore, the level of echo attenuation may not be satisfactory due to estimation errors. A simpler and harder-clipping solution can be achieved by removing all power from frequency bins in which the residual echo is in some sense dominant, while passing all power from frequency bins in which the residual echo is not dominant (and is therefore perceptually masked already). For example, the clipping criteria for each frequency bin k can be formed as:

$$H(k)=0 \text{ if } \Phi_e(k) < \delta_1 \hat{\Phi}_{\hat{s}}(k), \text{ else } H(k)=1$$

Since the above equation will provide a rapidly changing power spectral density (due to the abrupt changes between H(k)=1 and H(k)=0 over time), the filtering characteristic can be smoothed or averaged in practice to provide soft transitions. Doing so provides high performance with a minimum of distortion (such as of musical tones). For example, a smoothened NLP filter $H_{av}(k)$ can be updated as:

$$H_{av}(k) = H(k)(1 - \alpha(1 - H_{av}(k)))$$

where emperical studies have shown that a suitable value for α is, e.g., 0.6.

The frequency domain version of the error signal E(k) (derived by taking an M-point FFT of the time domain error signal e(n)) is then filtered using the smoothened NLP transfer function $H_{av}(k)$, and the result is finally transformed back to the time domain using an Inverse Fast Fourier Transform (IFFT). In other words, the echo suppressed NLP output is given by:

$$e_{NLP}(n) = \text{IFFT}(H_{av} \cdot E)$$

where · denotes elementwise multiplication of the vectors $H_{av}$ and E. Alternately, the frequency domain vectors $H_{av}$ and E could first be transformed to the time domain and then convolved to provide the NLP output.

While the NLP output given by the previous equation will effectively suppress residual echo as desired, note that the removed frequencies will also result in a varying background level from a receiving user's perspective. According to another aspect of the invention, however, this effect can be lessened by strategically replacing the removed energy.

Specifically, the output signal can be smoothened by adding energy at the suppressed frequencies so that the total energy at those frequencies is equal to the prevailing background noise level.

For example, a Voice Activity Detector (VAD) can be used to determine whether speech (either source or echo) is present in the input to the NLP. During speech pauses, the VAD indicates that only noise is present, and an estimate of the power spectral density of the prevailing background noise can be updated as:

$$\hat{\Phi}_{v2}(k) = \beta \hat{\Phi}_{v2}(k) + (1-\beta) V_2(k) V^*_2(k)$$

Methods for implementing the functionality of the VAD are well known. Also, emperical studies have shown that, when updating the noise estimate, it is reasonable to assume that background noise is stationary for about one second in the context of mobile telephony, and for even longer periods in the context of a fixed telephony network.

The background noise estimated during speech pauses is then used, during periods with residual echo (either single talk or double talk), to provide a comfort noise spectrum which effectively fills the holes created by the filter $H_{av}(k)$. In other words, a comfort noise spectrum $C(k)$ can be created as:

$$C(k) = \sqrt{(1-H(k)H(k))\hat{\Phi}_{v2}(k)} N(k)$$

where $N(k)$ is the Fourier transform of a white noise sequence with unit variance.

Alternatively, the comfort noise spectrum $C(k)$ can be created as:

$$C(k) = \sqrt{(1-H(k)H(k))\hat{\Phi}_{v2}(k)} e^{i\phi(k)}$$

where the phase $\phi(k)$ is randomly distributed between $-\pi$ and $\pi$ for k in the interval 1 to M/2-1, and $\phi(0) = \phi(M/2) = 0$. For frequencies above the Nyqvist frequency M/2, the phase is given by:

$$\varphi(k) = -\varphi(M-k) \quad k \in \left[\frac{M}{2}+1, M-1\right]$$

Since the phase in $C(k)$ is conjugate symmetric, a real time domain sequence $c(n)$ is guaranteed. The resulting comfort noise is then added to the echo suppressed output signal to obtain the echo suppressed and comfort noise enhanced output signal as follows:

$$e_{NLP+CN}(n) = e_{NLP}(n) + c(n)$$

Alternatively, the echo suppressed and comfort noise enhanced output signal can first be computed in the frequency domain and then transformed to the time domain as follows:

$$E_{NLP+CN}(k) = H_{av}(k) \cdot E(k) + C(k)$$

$$e_{NLP+CN} = \text{IFFT}(E_{NLP+CN})$$

In sum, the present invention provides frequency domain, nonlinear processing techniques for, e.g., echo suppression. Generally, a nonlinear processor constructed in accordance with the present invention removes energy at frequencies where, e.g., residual echo in a communications signal is dominating (e.g., where the residual echo power constitutes more than a certain percentage of the overall power in the communications signal). The present invention further teaches methods for replacing the removed energy to thereby smoothen the resulting signal, e.g., to improve a receiving user's perception of the echo suppressed signal. Advantageously, a nonlinear processor according to the invention can suppress residual echo during the entirety of a conversation. Those skilled in the art will appreciate that the above described algorithms of the invention can be applied in either sample-wise or block-wise fashion. Those skilled in the art will also appreciate that computational complexity can be reduced, and speed advantages can be gained, by grouping frequency bins when carrying out the above described procedures.

Figure 4:
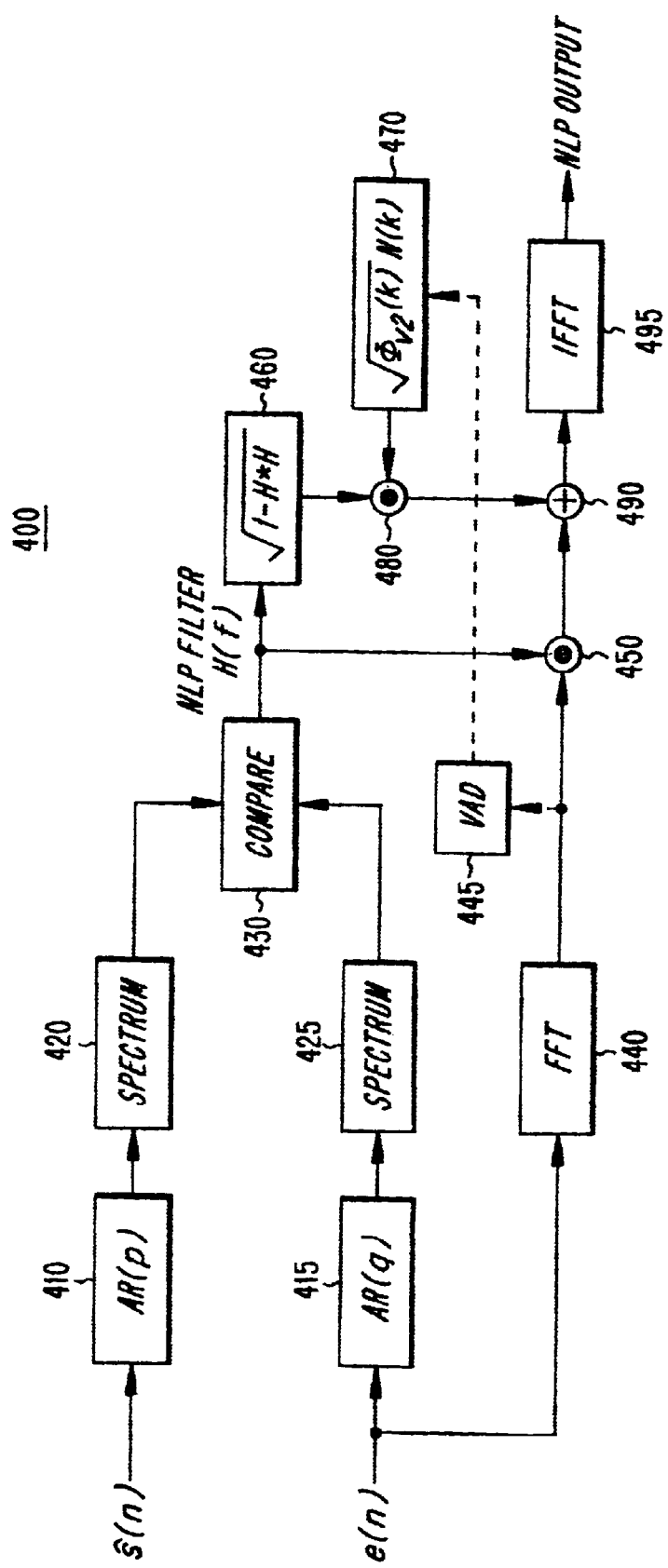
FIG. 4 is a flowchart depicting steps in an exemplary method of residual echo suppression according to the invention.

A particularly useful algorithm 400 according to the invention is depicted by way of a flowchart in FIG. 4. At step 410, an auto-regressive model of order p is computed from the time domain estimate (e.g., using the well known Levinson-Durbin algorithm), and at step 420, the resulting time domain model is converted to the frequency domain (e.g., by way of an FFT). Similarly, at steps 415 and 425, a time domain error signal is modeled (using an auto-regressive model of order q) and converted to the frequency domain. The resulting frequency domain sequences are then compared at step 430 to provide a filter transfer function H for a nonlinear processor. For example, each tap of the NLP filter H can be set to 1 or 0 depending upon whether, for the corresponding tap frequency, the power of the estimated echo is greater than a predefined fraction of the power of the error signal.

At step 440, an FFT of the error signal is computed, and at step 450 the resulting frequency domain error sequence is filtered (i.e., element-wise multiplied) by the NLP filter H to provide an echo suppressed output signal in the frequency domain. Meanwhile, the filter function H is scaled at step 460, and randomized comfort noise having a magnitude equal to a prevailing level of error signal background noise is generated at step 470. As described above, the comfort noise generation is based on estimates of the prevailing background noise, the noise estimates being updated only when no speech is present in the error signal (shown via the VAD at step 445 in the figure). The results of steps 460 and 470 are combined at step 480 to provide comfort noise specifically tailored to appropriately replace energy removed from the error signal by the NLP filter H. At step 490, the resulting comfort noise is element-wise added to the echo suppressed output signal to provide an echo suppressed and comfort noise enhanced output signal in the frequency domain. Finally, at step 495, an IFFT is used to convert the echo suppressed and comfort noise enhanced output signal to the time domain.

Those skilled in the art will appreciate that the present invention is not limited to the specific exemplary embodiments which have been described herein for purposes of illustration and that numerous alternative embodiments are also contemplated. For example, although the disclosed NLP embodiments have been described with reference to systems including a leading echo canceler, these same NLP embodiments can also be used as stand alone devices to provide solutions superior to those provided by conventional on/off switching. The derivation syntax provided above with respect to a leading echo canceler and a trailing NLP can be readily applied to a stand alone NLP by everywhere replacing the echo estimate ŝ with the echo causing signal x(t). In such case, the residual echo can be estimated at some fixed or dynamically adjusted level below the echo-causing (e.g., loudspeaker) signal, based on the expected or measured echo return path. The scope of the invention is therefore defined by the claims appended hereto, rather than the foregoing description, and all equivalents which are consistent with the meaning of the claims are intended to be embraced therein.

We claim:

1. A method for suppressing a residual echo in a communications signal using a frequency domain selective Non-Linear Processor, comprising the steps of:

computing a power spectrum of the communications signal;

estimating a power spectrum of the residual echo;

comparing the computed power spectrum of the communications signal and the estimated power spectrum of the residual echo;

adjusting the frequency characteristics of a filter H(k) to block only signal frequencies at which the residual echo power exceeds a predefined percentage of the communications signal power, based upon a result of said step of comparing; and adaptively filtering the communications signal with the computed filter H(k), to suppress the residual echo while providing full duplex communication.

2. The method of claim 1, wherein said step of computing a power spectrum of the communications signal comprises the steps of:

converting a number of time domain samples of the communications signal to a corresponding number of complex frequency domain samples of the communications signal; and multiplying each complex frequency domain sample of the communications signal by its complex conjugate to provide power spectrum samples of the communications signal.

3. The method of claim 2, wherein said step of converting a number of time domain samples of the communications signal to a corresponding number of complex frequency domain samples of the communications signal includes the step of computing a Fast Fourier Transform of the number of time domain samples of the communications signal.

4. The method of claim 3, wherein said step of converting a number of time domain samples of the communications signal to a corresponding number of complex frequency domain samples of the communications signal also includes the step of computing an auto-regressive model for the time domain samples prior to computing the Fast Fourier Transform.

5. The method of claim 1, wherein the residual echo results from a source signal being transmitted through an echo return path, and wherein said step of estimating a power spectrum of the residual echo comprises the steps of:

converting a number of time domain samples of the source signal to a corresponding number of complex frequency domain samples of the source signal;

multiplying each complex frequency domain sample of the source signal by its complex conjugate to provide power spectrum samples of the source signal;

estimating an attenuation factor of the echo return path; and scaling the power spectrum samples of the source signal by the estimated attenuation factor to provide estimated power spectrum samples of the residual echo.

6. The method of claim 5, wherein the estimate of the attenuation factor of the echo return path is static.

7. The method of claim 5, wherein the attenuation factor of the echo return path is estimated dynamically.

8. The method of claim 5, wherein said step of converting a number of time domain samples of the source signal to a corresponding number of complex frequency domain samples of the source signal includes the step of computing a Fast Fourier Transform of the number of time domain samples of the source signal.

9. The method of claim 8, wherein said step of converting a number of time domain samples of the source signal to a corresponding number of complex frequency domain samples of the source signal also includes the step of computing an auto-regressive model for the time domain samples prior to computing the Fast Fourier Transform.

10. The method of claim 1, wherein the communications signal is output by an adaptive echo canceler based on an input signal and based on an estimate of an echo component of the input signal, and wherein said step of estimating a power spectrum of the residual echo comprises the steps of:

computing a power spectrum of the echo component estimate; and scaling the power spectrum of the echo component estimate, based on operation of the adaptive echo canceler, to provide the estimate of the power spectrum of the residual echo.

11. The method of claim 10, wherein said step of scaling the power spectrum of the echo component estimate comprises the steps of:

determining an echo return loss enhancement of the adaptive echo canceler; and multiplying the power spectrum of the echo component estimate by the echo return loss enhancement to provide the estimate of the power spectrum of the residual echo.

12. The method of claim 10, wherein said step of scaling the power spectrum of the echo component estimate comprises the steps of:

determining an echo return loss enhancement of the adaptive echo canceler;

computing an average value for the power spectrum of the echo component estimate;

multiplying the average value by the echo return loss enhancement to provide a saturation value;

multiplying the power spectrum of the echo component estimate by the echo return loss enhancement to provide a scaled spectrum; and clipping the scaled spectrum at the saturation value to provide the estimate of the power spectrum of the residual echo.

13. The method of claim 10, wherein the power spectrum of the echo component estimate is given by $\Phi(k)$, k a finite positive integer, wherein an echo return loss enhancement of the adaptive echo canceler is given by ERLE, and wherein the estimate of the power spectrum of the residual echo is computed as:

$$ERLE\Phi_s(k).$$

14. The method of claim 13, wherein the echo return loss enhancement can vary as a function of frequency and is given by ERLE(k).

15. The method of claim 10, wherein the power spectrum of the echo component estimate is given by $\Phi(k)$, k a finite positive integer, wherein an echo return loss enhancement of the adaptive echo canceler is given by ERLE, and wherein the estimate of the power spectrum of the residual echo is computed as:

$$\text{Max}(ERLE\Phi_s(k), \overline{ERLE\Phi_s}).$$

16. The method of claim 15, wherein the echo return loss enhancement can vary as a function of frequency and is given by ERLE(k).

17. The method of claim 1, further comprising the step of adding comfort noise to the filtered communications signal.

18. The method of claim 17, wherein said step of adding comfort noise to the filtered communications signal comprises the steps of:
  estimating a power spectrum of a noise component of the communications signal; and
  creating the comfort noise based upon the estimated power spectrum of the noise component of the communications signal.

19. The method of claim 1, wherein the step of comparing the computed power spectrum of the communications signal and the estimated power spectrum of the residual echo includes comparing the spectral content of an error signal to an estimate of the spectral content of the residual echo, and the step of adjusting a filtering characteristic includes adjusting the filtering characteristic to pass only those frequencies for which the residual echo is the dominant component of the error signal.

20. A method for suppressing a residual echo in a communications signal using a frequency domain selective Non-Linear Processor, comprising the steps of:
  computing a power spectrum of the communications signal;
  estimating a power spectrum of the residual echo;
  comparing the computed power spectrum of the communications signal and the estimated power spectrum of the residual echo;
  adjusting a filtering characteristic to block only signal frequencies at which the residual echo power exceeds a predefined percentage of the communications signal power, based upon a result of said step of comparing; and
  adaptively filtering the communications signal, using the adjusted filtering characteristic, to suppress the residual echo while providing full duplex communication,
  wherein the filtering characteristic is given by a number of coefficients H(k), k a finite positive integer, wherein the computed power spectrum of the communications signal is given by $\Phi_e(k)$, wherein the estimated power spectrum of the residual echo is given by $\Phi_s(k)$, where $\delta_1$ is a subtraction factor, and wherein the filtering characteristic is computed as:

$$H(k) = \sqrt{\frac{\Phi_e(k) - \delta_1 \Phi_s(k)}{\Phi_e(k)}}.$$

21. A method for suppressing a residual echo in a communications signal using a frequency domain selective Nonlinear Processor, comprising the steps of:
  computing a power spectrum of the communications signal;
  estimating a power spectrum of the residual echo;
  comparing the computed power spectrum of the communications signal and the estimated power spectrum of the residual echo;
  adjusting a filtering characteristic to block only signal frequencies at which the residual echo power exceeds a predefined percentage of the communications signal power, based upon a result of said step of comparing; and
  adaptively filtering the communications signal, using the adjusted filtering characteristic, to suppress the residual echo while providing full duplex communication,
  wherein the filtering characteristic is given by a number of coefficients H(k), k a finite positive integer, wherein the computed power spectrum of the communications signal is given by $\Phi_e(k)$, wherein the estimated power spectrum of the residual echo is given by $\Phi_s(k)$, wherein $\delta_1$ is a subtraction factor, and wherein the filtering characteristic is computed as:

$$H(k)=0 \text{ if } \Phi_e(k)<\delta_1 \Phi_s(k), \text{ else } H(k)=1.$$

22. The method of claim 21, wherein the filtering characteristic coefficients H(k) are averaged over time.

23. A method for suppressing a residual echo in a communications signal using a frequency domain selective Non-Linear Processor, comprising the steps of:
  computing a power spectrum of the communications signal;
  estimating a power spectrum of the residual echo;
  comparing the computed power spectrum of the communications signal and the estimated power spectrum of the residual echo;
  adjusting a filtering characteristic to block only signal frequencies at which the residual echo power exceeds a predefined percentage of the communications signal power, based upon a result of said step of comparing;
  adaptively filtering the communications signal, using the adjusted filtering characteristic, to suppress the residual echo while providing full duplex communication; and
  adding comfort noise to the filtered communications signal, said step of adding comfort noise comprising the steps of:
    estimating a power spectrum of a noise component of the communications signal; and
    creating the comfort noise based upon the estimated power spectrum of the noise component of the communications signal,
  wherein the filtering characteristic is given by a number of coefficients H(k), k a finite positive integer, wherein the estimated power spectrum of the noise component of the communications signal is given by $\Phi_{v2}(k)$, wherein N(k) represents a Fourier transform of a white noise sequence of unit variance, and wherein a spectrum C(k) of the comfort noise is computed as:

$$C(k)=\sqrt{(1-H(k))\Phi_{v2}(k)}N(k).$$

24. An echo suppressor for suppressing a residual echo in a communications signal using a frequency domain selective Non-Linear Processor, said echo suppressor comprising:
  a processor configured to compute a power spectrum of a communications signal, to estimate a power spectrum of a residual echo component of the communications signal, and to perform a comparison of the computed power spectrum of the communications signal and the estimated power spectrum of the residual echo; and
  an adaptive frequency filter that receives the comparison from the processor, processes the communications signal, and adaptively adjusts a frequency characteristic to block only signal frequencies at which the residual echo power exceeds a predefined percentage of the communications signal power, thereby suppressing the residual echo component while enabling full duplex communication.

25. A device for suppressing a residual echo in a communications signal, comprising;
  means for computing a power spectrum of the communications signal;

means for estimating a power spectrum of the residual echo;

means for comparing the computed power spectrum of the communications signal and the estimated power spectrum of the residual echo;

means for adjusting the frequency characteristics of a filter H(k) to block only signal frequencies at which the residual echo power exceeds a predefined percentage of the communications signal power, based upon a result from said means for comparing; and means within the computed filter H(k), for adaptively filtering the communications signal, to suppress the residual echo while providing full duplex communication.

26. A method for suppressing a residual echo in a communications signal, comprising the steps of:

computing a power spectrum of the communications signal;

estimating a power spectrum of the residual echo;

adjusting the frequency characteristics of a filter H(k) to block only signal frequencies at which the residual echo power exceeds a predefined percentage of the communications signal power, based upon the computed power spectrum of the communications signal and upon the estimated power spectrum of the residual echo; and adaptively filtering the communications signal with the filter H(k), to suppress the residual echo while providing full duplex communication, wherein, in at least one of said computing and estimating steps, a power spectrum is derived from an auto-regressive model of a time-domain signal.

27. A method according to claim 26, wherein said step of computing a power spectrum of the communications signal comprises the steps of:

computing an auto-regressive model of a number of time domain samples of the communications signal;

computing a Fast Fourier Transform of the auto-regressive model to provide a number of complex frequency domain samples of the communications signal; and multiplying each complex frequency domain sample of the communications signal by its complex conjugate to provide power spectrum samples of the communications signal.

28. A method according to claim 26 wherein the residual echo results from a source signal being transmitted through an echo return path, and wherein said step of estimating a power spectrum of the residual echo comprises the steps of:

computing an auto-regressive model of a number of time domain samples of the source signal;

computing a Fast Fourier Transform of the auto-regressive model to provide a number of complex frequency domain samples of the source signal;

multiplying each complex frequency domain sample of the source signal by its complex conjugate to provide power spectrum samples of the source signal;

estimating an attenuation factor of the echo return path; and scaling the power spectrum samples of the source signal by the estimated attenuation factor to provide estimated power spectrum samples of the residual echo.

29. A method according to claim 26, wherein the communications signal is output by an adaptive echo canceler based on an input signal and based on an estimate of an echo component of the input signal, and wherein said step of estimating a power spectrum of the residual echo comprises the steps of:

computing an auto-regressive model of a number of time domain samples of the echo component estimate;

computing a Fast Fourier Transform of the auto-regressive model to provide a number of complex frequency domain samples of the echo component estimate;

multiplying each complex frequency domain sample of the echo component estimate by its complex conjugate to provide power spectrum samples of the echo component estimate; and scaling the power spectrum samples of the echo component estimate, based on operation of the adaptive echo canceler, to provide the estimate of the power spectrum of the residual echo.

* * * * *